United States Patent
MacGregor (10) Patent No.: US 9,168,473 B2
(45) Date of Patent: Oct. 27, 2015

(54) VACUUM LOADER FOR CONVEYING POWDER

(71) Applicant: Anthony MacGregor, Ontario (CA)

(72) Inventor: Anthony MacGregor, Ontario (CA)

(73) Assignee: ColourMate, Inc., Woodbridge, Ontario (CA)

( * ) Notice: Subject to any disclaimer, the term of this patent is extended or adjusted under 35 U.S.C. 154(b) by 0 days.

(21) Appl. No.: 14/400,665

(22) PCT Filed: Aug. 13, 2013

(86) PCT No.: PCT/CA2013/050619
§ 371 (c)(1),
(2) Date: Nov. 12, 2014

(87) PCT Pub. No.: WO2014/026281
PCT Pub. Date: Feb. 20, 2014

(65) Prior Publication Data
US 2015/0151229 A1    Jun. 4, 2015

Related U.S. Application Data

(66) Substitute for application No. 61/682,955, filed on Aug. 14, 2012.

(51) Int. Cl.
*B29C 45/76* (2006.01)
*B01D 45/00* (2006.01)
*B29C 31/04* (2006.01)
*B01D 45/04* (2006.01)
*B01D 45/16* (2006.01)
*B29C 31/02* (2006.01)
*B29C 45/50* (2006.01)

(52) U.S. Cl.
CPC ............... *B01D 45/00* (2013.01); *B01D 45/04* (2013.01); *B01D 45/16* (2013.01); *B29C 31/02* (2013.01); *B29C 31/042* (2013.01); *B29C 45/5008* (2013.01); *B29C 45/76* (2013.01)

(58) Field of Classification Search
CPC .......................... B29C 45/5008; B29C 45/76
USPC .................................................. 425/145, 585
See application file for complete search history.

(56) References Cited

U.S. PATENT DOCUMENTS

| | | | |
|---|---|---|---|
| 2,708,033 A | 6/1951 | Thomas | |
| 5,791,830 A | 8/1998 | Fort et al. | |
| 8,011,914 B2* | 9/2011 | Taylor et al. | 425/145 |
| 2014/0308387 A1* | 10/2014 | Lindee et al. | 425/585 |

OTHER PUBLICATIONS

International Preliminary Report on Patentability and Written Opinion for PCT/CA2013/050619 dated Feb. 17, 2015.

* cited by examiner

*Primary Examiner* — Tim Heitbrink
(74) *Attorney, Agent, or Firm* — McCormick, Paulding & Huber, LLP (57) ABSTRACT

Plastic powder/dust is cyclonically pulled into the loading chamber by vacuum. The finer dust rises due to the flow of air upwardly through a separation chamber, and a coaxially arranged intensifying chamber communicates with the lower portion of the loading chamber by a tube that recovers the finer dust. At least two filters between the vacuum unit and the separator, are sequentially activated during phases of successive cycles, so the inactive filter can be cleared of dust by admitting ambient air so the cleared dust is delivered to the loading chamber. Multiple miniature cyclonic separators are provided atop the primary loader in a version without filters.

14 Claims, 6 Drawing Sheets

VACUUM LOADER FOR CONVEYING POWDER

CROSS REFERENCE TO RELATED APPLICATIONS

This application is entitled to the benefit of and incorporates by reference subject matter disclosed in International Patent Application No. PCT/CA2013/050619 filed on Aug. 13, 2013 and U.S. Provisional Application No. 61/682,955 filed Aug. 14, 2012.

BACKGROUND OF THE INVENTION

For many years ColourMate of Woodbridge, Ontario Canada has manufactured and sold filter-less vacuum loaders to operators of plastic molding machines. ColourMate's FL-110 is designed for delivering granulated plastic particles to such machines. The FL110 conveys plastic pellets, or free flowing reground plastic particles to plastic molding machines, and in this prior art loader, material enters the frusto-conical vacuum receiver through a tangentially oriented inlet. The air swirls around inside this receiver, so that the plastic pellets separate out and fall downwardly in a cyclonic material/air separation process. Air is drawn through the receiver by a conventional vacuum power unit connected to the closed top of the receiver. Dust entrained in the air exiting the loader, is readily filtered out by a conventional vacuum power unit.

SUMMARY OF THE INVENTION

The vacuum loader of the present invention utilizes cyclonic action as in prior art loaders such as the FL-110, but instead of a single stage design, a two stage cyclonic separator provides improved air/powder separation. An intensifying upper chamber plus an inner dust collection tube recover the dust, that would otherwise be clogging a conventional filter. The fine dust is directed into the same supply hopper where the powder from the cyclonic loading chamber is deposited by way of the unique dust collection tube. A dual valve discharge provides powder and dust to the hopper of the molding machine.

OPERATION

The vacuum loader disclosed herein is designed to convey free-flowing powders, such as finely reground plastic particles, from a source or reservoir to a processing machine cyclically and only as needed to meet the requirements of the plastic processing machine, without requiring extensive filtration of the exhaust air reentering the atmosphere from the vacuum power unit. The power unit may or may not be fitted with its own filter, and may or may not be built into the loader itself.

Figure 1:
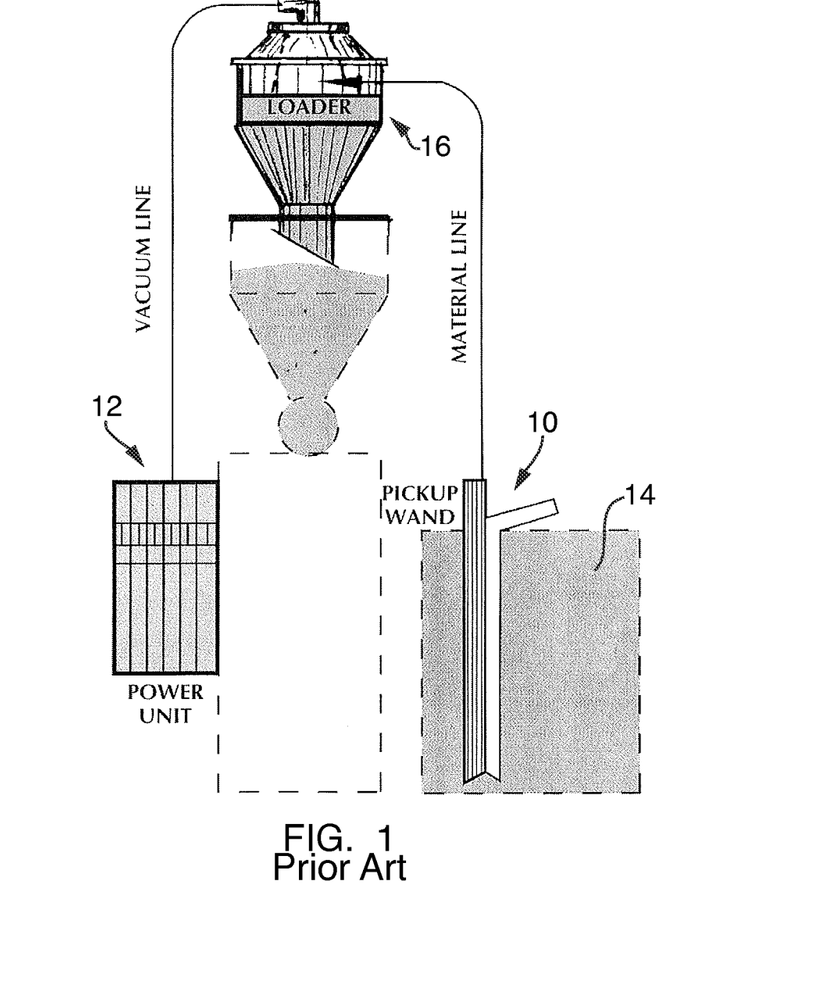
FIG. 1 shows a commercially available prior art Colour-Mate FL-110 vacuum loader for plastic molding machines. A vacuum pickup wand 10, connected to a vacuum power unit 12, sucks pelletized material from a supply 14 into a loading chamber 16. The air/plastic powder mixture is tangentially spun in this frusto conical chamber so that the heavier plastic powder material falls away from the airflow due to the vacuum created at the top 16a. A control system cycles this vacuum source to replenish the material stored in a supply hopper for use in the molding machine.
Figure 2:
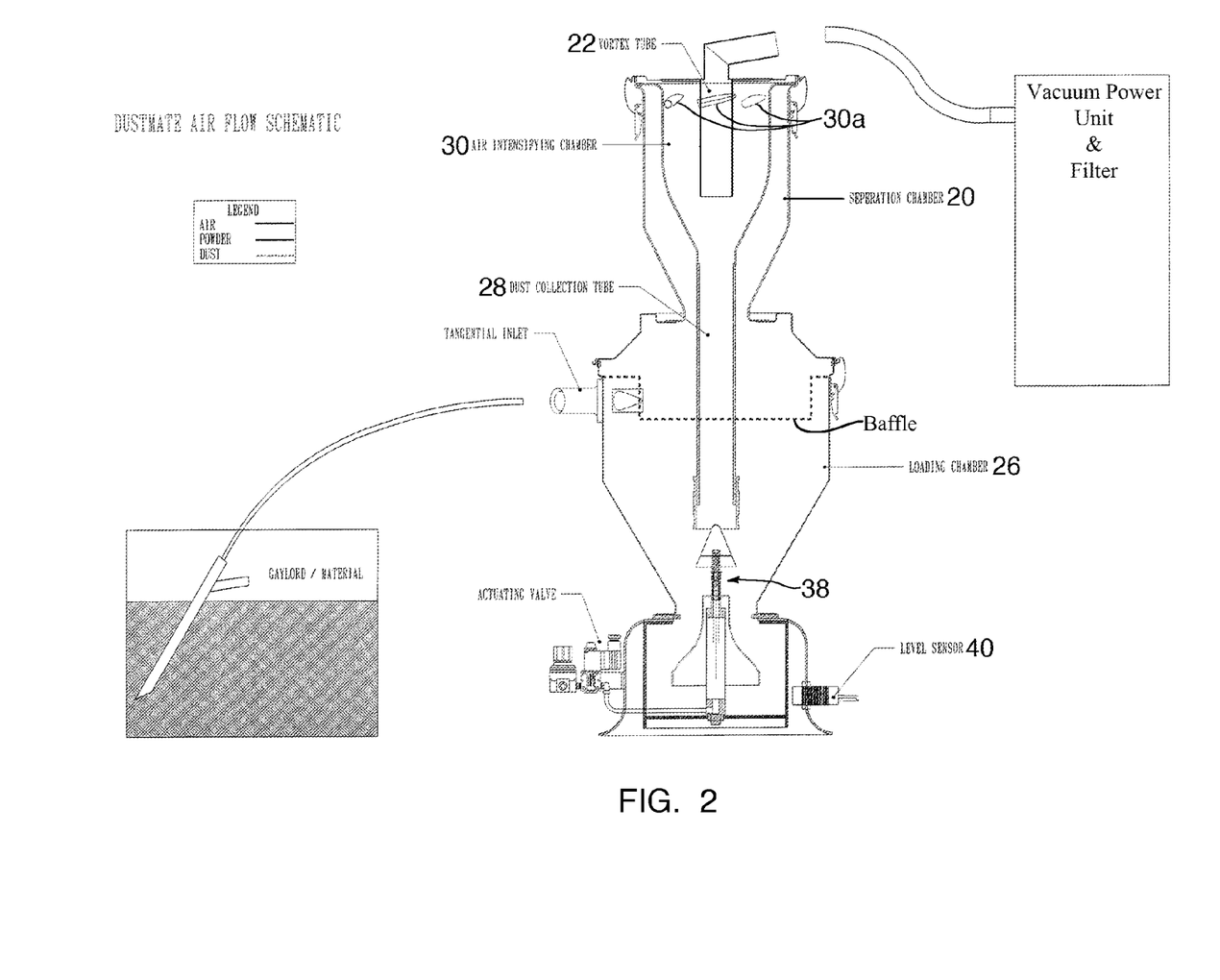
FIGS. 2 and 3 show a dual stage cyclonic separator having many features of the prior art vacuum loader of FIG. 1, but also including a secondary upper separation chamber 20 which houses a downwardly extending vortex tube 22 that provides vacuum for both the loading chamber 26 and the separation chamber 20. Six tangential openings 30a, 30a surround the upper boundary of internal intensifying chamber 30 to draw the air and the finer particles upwardly as suggested by arrows 30b, 30b. The finer powder/dust drops down, as shown by arrows 30c, 30c, through a tube 28 attached to and communicating with internal chamber 30. This tube 28 and internal chamber 30 are housed in the secondary stage separation chamber above the loading chamber 26.

The pickup wand is speared into the material reservoir. An inrushing flow of atmospheric air is drawn by vacuum up this wand. The relative proportion of plastic powder in the airflow can be controlled by an adjustable air valve mounted on the wand. The powder is entrained by the air and travels through a flexible vacuum hose, and enters the vacuum receiver through a tangential inlet. A baffle of hat shape is provided in the loading chamber, and deflects a portion of the flow downwardly, supplementing the effect of gravity on the powder as it swirls downwardly inside the loading chamber. The baffle is shown in FIG. 2, and is arranged at the tangential entry area of the air/dust flow from the supply hose connecting the wand to the upper portion of the loading chamber. This cyclonic introduction of the material/air into the vacuum receiver separates larger plastic particulate from the air flow.

Laden with only fine dust particles, the air slowly rises from the loading chamber into the upper separation chamber. At the top of this upper chamber, the air flow enters six restrictive tangentially oriented inlets. Thus, the air speed of the mixture is increased as it enters the intensification chamber. Here, the air flow is aerodynamically directed into a circular flow pattern that spirals downwardly. Although the air readily rises upwardly into the vortex tube, the dust tends to drop down into the collection tube. Gravity and the inertia of these quickly moving particles, forces them to follow this downward spiraling path. At some point, the air flow and finest dust separates from this circling mass, changes course, and moves upwardly through the central vortex tube. At this juncture the air flow carries only the finest dust particles. Air and only the finest particles exit the vortex tube, passing upwardly through the top of the upper chamber, thence through the flexible vacuum hose into the vacuum power unit. The vacuum power unit preferably comprises a conventional dust collection unit providing inlet suction in the vacuum line 18 from an internal blower that discharges filtered air through an outlet, at the top, collecting dust in a canister, generally at the bottom of the unit. The blower is driven from a vacuum motor M, controlled by a timer TDRA shown in FIG. 4. The air flows through the filter, and the dustless air carries on through the impellers of the vacuum fan, and is expelled into the ambient production plant air. Alternatively, the source of vacuum might be a manifold servicing several processing machines, each machine having a valve to control the cyclical requirements of an associated loader.

A level sensor switch LS at the processing machine supply hopper controls the commencement of each loading cycle. The vacuum motor is normally off, as is the fluid pressure to the piston for raising the cone valves. The dual cone discharge allows the lower end of the dust collection tube to be sealed, separating the dust from the vacuum air until the loading phase at the end of each cycle of operation.

Figure 4:
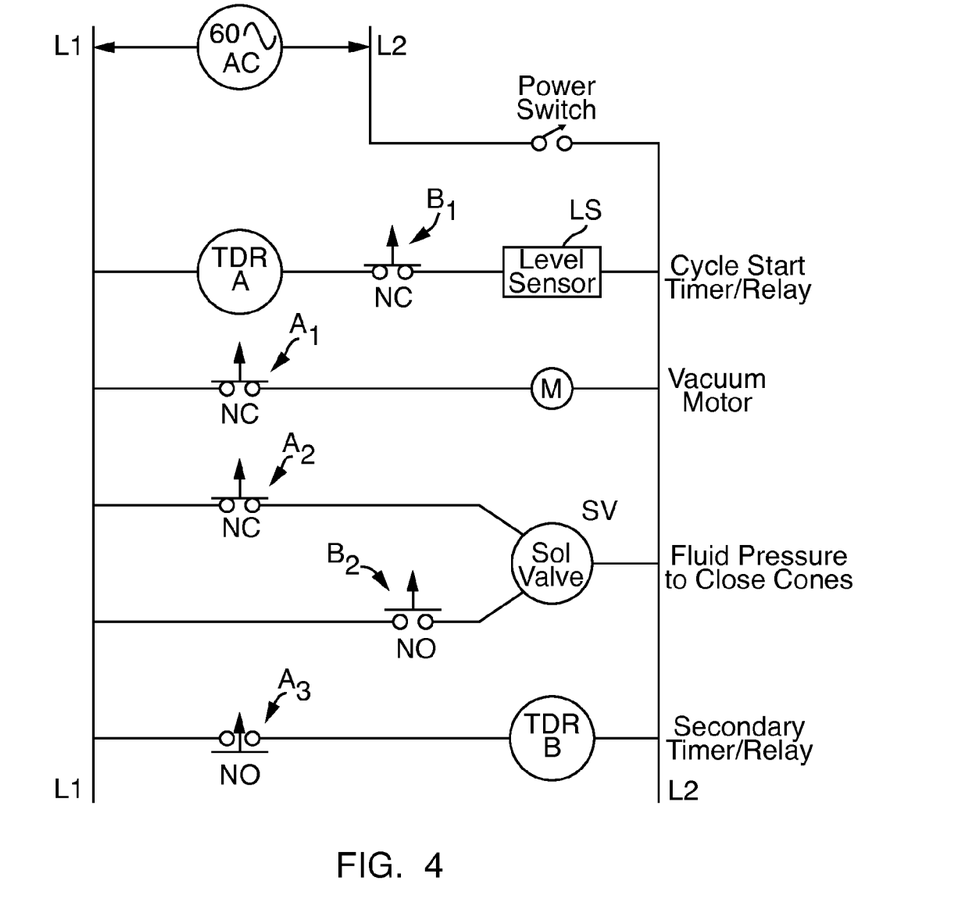
FIG. 4 is a schematic diagram illustrating a control circuit for timing the operation of the vacuum motor and the discharge cones.

As suggested in FIG. 4, the main timer TDRA is energized upon closing of level sensor switch LS and normally closed TDRA contacts $A_1$ and $A_2$ energize vacuum motor M and solenoid valve SV respectively. This solenoid valve SV operates the fluid actuator raising the dual valve cone elements. A third set of contacts $A_3$ is normally open, and when closed, controls a secondary timer TDRB. Only after both the main timer TDRA and the secondary timer TDRB have timed out will the discharge cone valves drop and the powder and recovered dust settle into the hopper supplying the processing machine.

Prior to discharging the powder from the loading chamber, and the dust from the collection tube, a timed delay allows air pressure to normalize inside the chambers of the loader. Vacuum motor M shuts off before secondary timer TDRB times out, allowing the discharge cones to drop the charge of powder and dust into the processing machine supply hopper.

The dual cones are pneumatically operated to close the openings, and when lowered, supply both powder and dust simultaneously into the production machine supply hopper.

Controls

The vacuum motor M in the vacuum power unit is controlled by a timer TDRA, which cycles on-off, in response to the material level sensor in the supply hopper of the plastic processing machine. See FIG. 4 for details of a control circuit suitable for cyclically operating the vacuum loader.

When the level sensor/switch LS, mounted in the supply hopper for the processing machine, detects an absence of material in the supply hopper, the loading cycle begins.

The vacuum motor M is energized for a preset time, determined by timer TDRA, allowing the vacuum receiver to fill. When timer TDRA has timed out the vacuum motor M is turned off. After a second time delay, determined by TDRB, the dual discharge cone is retracted, allowing the dust tube and vacuum receiver to simultaneously empty the powder charge into the processing machine supply hopper. After said timed "rest" period, dictated by such sequential operation of TDRA and TDRB, the loading cycle is in condition to begin again. The level sensor LS must first sense that the machine requires replenishing to restart a new cycle. The vacuum motor will not be energized, and loading is delayed until the material level at the processing machine supply hopper has dropped. As the plastic processing machine consumes material, the material level in the supply hopper will drop, and the level sensor LS allows another cycle to be initiated. This sequence of operation enables the vacuum loader to automatically maintain sufficient material in the processing machine supply hopper.

Special Features

The vacuum loader is of unique design. One distinguishing feature is stacked dual chambers. A collection tube captures the finer dust size plastic powder separately from the larger particles that drop down into the funnel shaped lower region of the primary loading chamber. Another feature of the loader is the separation chamber above that loading chamber, with the air intensifier inside of and above it. This arrangement allows for significantly improved air-dust separation In order for the cyclonic material/air separators to work efficiently, it is imperative that there are no vacuum leaks in the system. Any leaks will allow the flow path of the air to change, and dramatically affect performance. The only air "leak" is provided at the pickup wand, where an adjustment may be made to provide for variations in the sizes of particulate plastic mix being withdrawn from the reservoir. This adjustment avoids poor cyclonic material-air separation, or dust finding an easier route to the power unit filter. Positive sealing is achieved with the dual cone discharge assembly. This assembly allows both cones to seal simultaneously, or nearly so, by the action of a single air actuator. The cones are coupled together by means of a compressible cushioned coupling, which allows a positive sealing surface for both cones, even though they are seated by means of a common air cylinder. This device also eliminates the possibility of excessive pressure on either sealing surface, and ensures that both the loading chamber bottom opening, and the powder tube, are both positively sealed.

Another unique feature is the time delayed discharge. This delay is an extremely important design feature that is integral to the efficient operation of the vacuum loader. During each loading cycle, following a first delay, the vacuum motor is turned off, and there is then a second delay before the chamber discharge is allowed to open. The second delay allows any residual vacuum in the loading chamber to bleed to atmosphere. If the cone valve element which seals the dust tube were to open before air pressure in the loading chamber was normalized, the inrush of air would carry any dust collected in the tube upwardly into the power unit filter.

Cycle of Events

Level sensor 40 detects no material in its proximity and is in electrical services with the sensor switch LS; (Refer to FIG. 4 for details on how the following events can be provided for)
- the vacuum motor is turned on for a preset number of seconds
- the dual cone discharge valves 38 is shifted to the closed position
- air/material is pulled into the loading chamber until filled with material
- dust collects in the dust collection tube 28

As the first electronic timer times out;
- the vacuum motor turns off
- the chambers are pressurized by ambient air and loading ceases
- the discharge delay timer is activated
- the delay timer times out and the dual cone discharge valves 38 move to the discharge position
- gravity allows the powder material to flow downwardly out of the loading chamber
- gravity allows dust to flow from the dust collection tube If the level sensor detects the presence of material in the supply hopper,
- the vacuum motor remains off and no loading occurs;

When the processing machine uses up the material in the supply hopper, so that the material level drops below the level sensor setting preset for the machine's needs;
- the cycle repeats, as the machine's requirements dictate, starting another cycle in response to the absence of adequate powder charge available for the processing machine. This function is met by the level sensor LS so that the vacuum motor is turned on and another loading cycle begins as a result of normally closed contacts $A_1$ in FIG. 4.

Analysis of Air/Dust Mixture Separation in Loader

As described previously, with reference to the vacuum loader cycle, the level sensor initiates the cycle when the plastic processing machine requires replenishing. The wand or plunger is adjusted to the desired ratio of air/powder, and the differential pressure between atmospheric and the vacuum pressure inside the loader entrains the powder in the flow of atmospheric air into the tangentially oriented inlet opening into the loader. The air/powder mixture swirls around inside the loading chamber, allowing the heavier plastic powder to move downwardly, as the air and finer plastic dust spiral upwardly into the separation chamber.

The tangentially oriented nozzle openings, defined in the cylindrical upper side wall of the intensifying chamber, lift the air and finer dust particles, and speed up the flow, redirecting the flow downwardly inside this intensifying chamber. The annular cross sectional area, defined between the vortex tube and said cylindrical upper side wall of the intensifying chamber, accelerates the mixture. Hence, as the air reverses direction, moving upwardly into the vortex tube, the finer dust separates out, dropping down into the dust collection tube.

Only a minimal amount of the finest dust will fail to be captured by this uniquely designed structure, and reach the vacuum power unit, optimizing the yield of plastic powder and dust delivered to the plastic processing machine.

Dust Collection and Recovery System for Cyclically Operated Vacuum Loader

Figure 5:
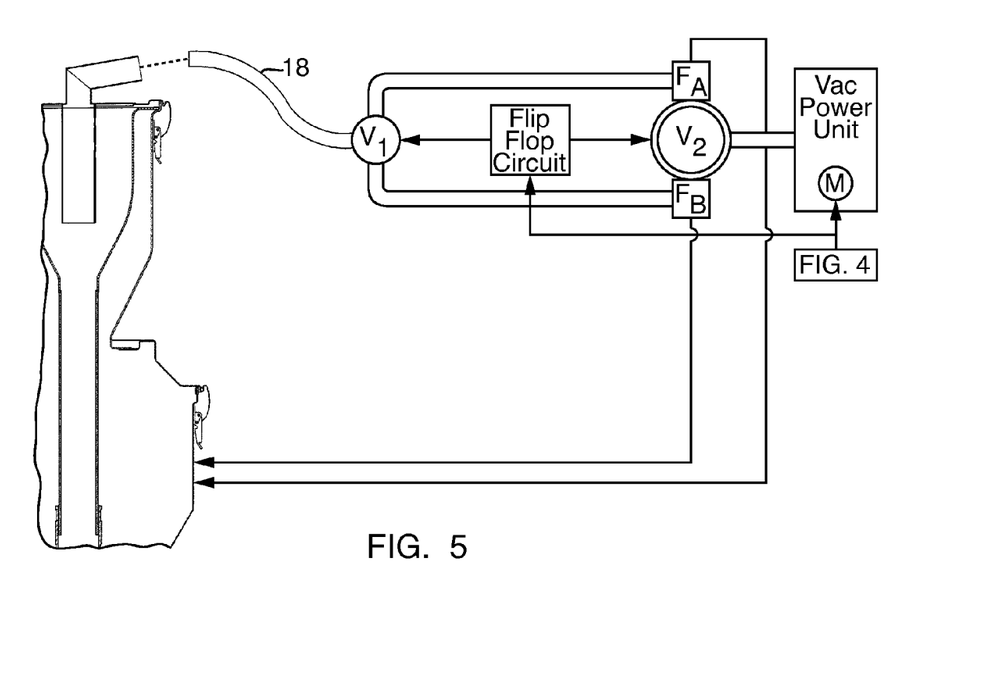
FIG. 5 shows a version of the loader having improved filtering and dust recovery.

In further accordance with my invention, and to provide a system for automatically clearing a plurality of conventional filters of dust, and recovering that dust for return to the vacuum loader, I have shown in FIG. 5 a preferred embodiment of such a system.

This drawing shows at least two dust filters provided in parallel, such that vacuum air flowing through these filters is controlled by valves so that one or both filters allows air to pass through to the vacuum unit during a given cycle of the loader, and more particularly during the dust collection phase thereof, when the vacuum motor is ON.

One of these two filters is cleaned of dust by reversing the flow through said other filter, preferably during the "given" cycle, and more particularly near the end of the collection phase thereof. This timing of the flow reversal through said other filter allows the dust (and reverse air flow) from that other filter to be returned to the loader during the collection phase of the loader cycle. Thus, filter $F_A$ and $F_B$ are alternately cleaned by reversing the air flow through each.

A simple flip-flop circuit is required, and supplements the loader's control circuit (FIG. 4) for activating the various valves shown in FIG. 5 in the sequence described infra and in timed relation to the activation of the vacuum motor M.

Figure 3:
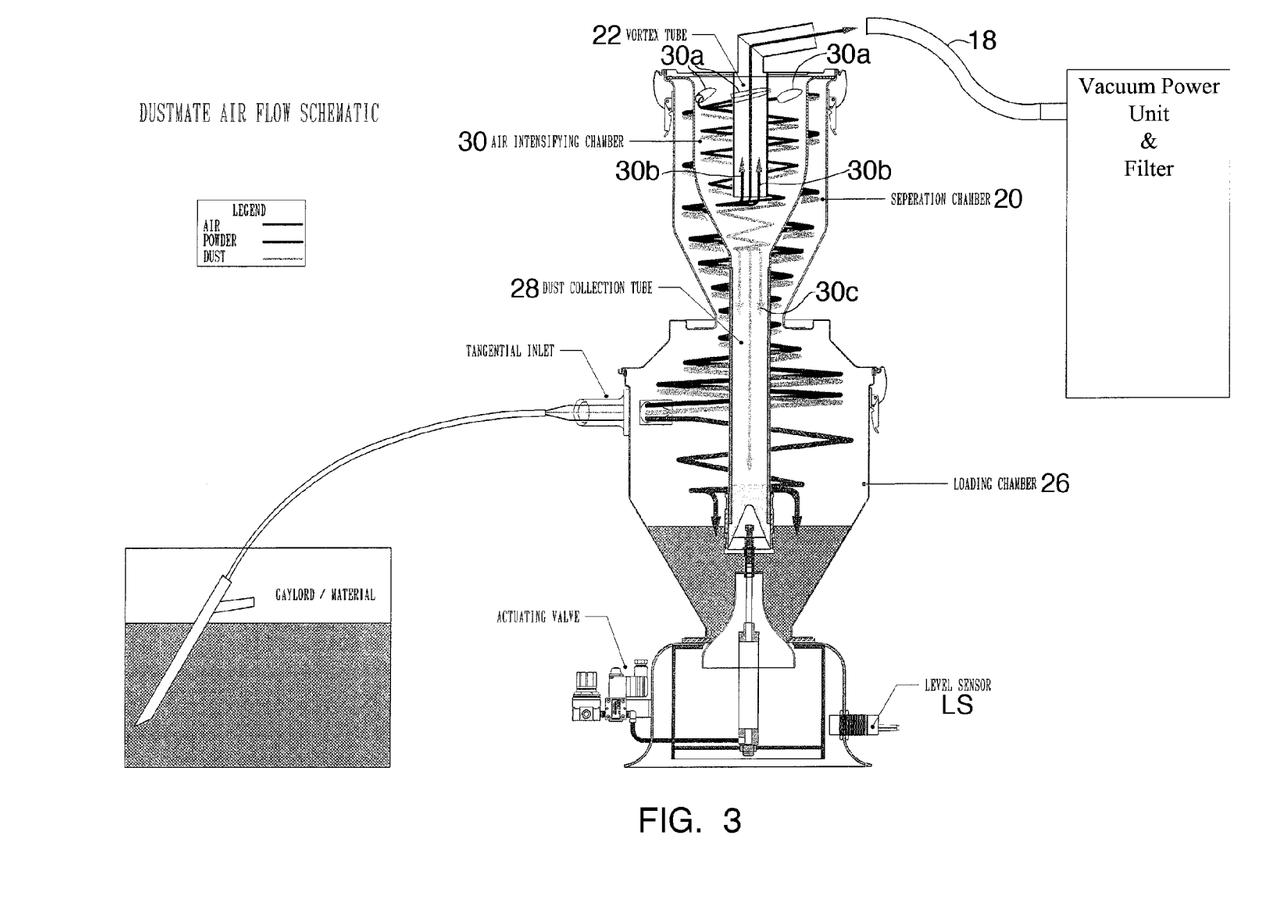

Conventional vacuum power units, such as that shown in FIGS. 2 and 3, have a single filter included in the unit itself. FIG. 5 shows additional filters $F_A$ and $F_B$ provided between the vacuum line 18 and the vacuum power unit including motor M. These filters are of the type that can be cleaned of dirt by admitting a short blast of ambient air through a valve $V_2$ provided between the filters for this purpose. During this filter cleaning a control valve $V_1$ between line 18 and each filter $F_A$ and $F_B$ selectively determines which of these filters $F_A$ and $F_B$ will provide filtered flow of vacuum air into the power unit by motor M. Providing for selective use of these two filters allows the inactive filter to be cleaned of dust by admitting ambient air to the inactive filter through valve $V_2$. Thus valve V2 clears the inactive filter when the active filter is collecting dust entrained in the air flow from line 18. This dust from the inactive filter is delivered to the loading chamber through one of two lines $L_A$ or $L_B$ associated with the filter $F_A$ or $F_B$ that is inactive as a result of selection valve $V_1$ directing the air flow to the active filter.

Valves V1 and V2 are linked as suggested by the line 21 in FIG. 5. Further, with reference to the control circuit of FIG. 4, clearing of these filters will occur only when vacuum motor M is operating. A flip flop circuit serves to operate these valves $V_1$ and $V_2$ alternatively as described above. Preferably, the blast of ambient air will be of short duration, and will not occur until near the end of the collection phase of the control system cycle described previously. A third time delay relay TDR3 is shown in FIG. 5 between the flip flop circuit and the vacuum motor M of FIG. 4 for illustrating how this abbreviated ambient air blast is accomplished near the end of the dust collection phase of each control system cycle.

Figure 6:
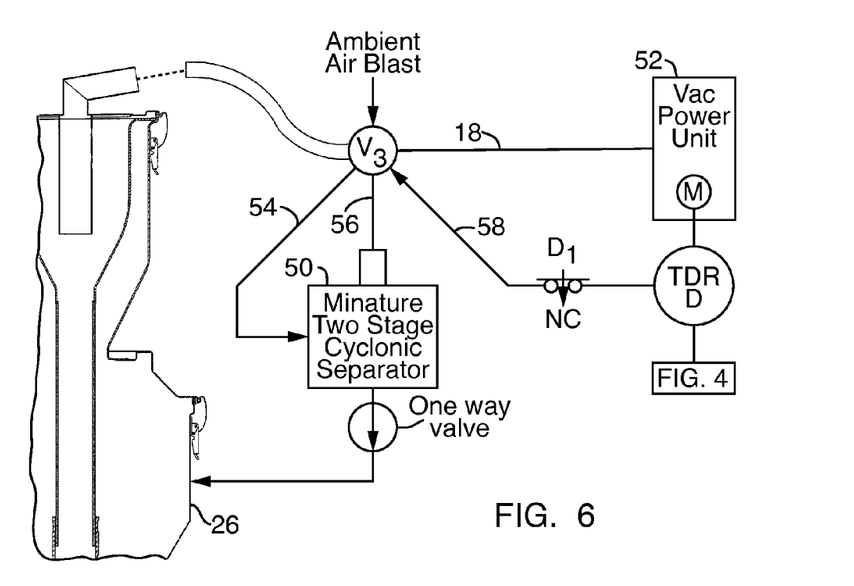
FIG. 6 shows another version of the loader utilizing a miniature of the dual stage cyclonic separator of FIGS. 2 and 3 in place of the recovery system shown in FIG. 5.

Description of FIG. 6 Embodiment

As will be evident from the above-described embodiment of my invention, filters are a common way in which to remove dust from a vacuum induced air flow. Not only do filters require cleaning and/or replacement, but filters generally fail to recover the dust collected therein. The purpose for a vacuum loader is to deliver the dust to a processing/molding machine, and to that end, I have shown in FIG. 6 another embodiment of my loader that utilizes a secondary, or one or more miniature two stage cyclonic separator 50 selectively connected to the vacuum source 52 by a multi-port spool valve $V_3$ so that during the dust collection phase of the primary cyclonic separator's load cycle (see FIG. 4) air and fine dust enter the miniature cyclonic separator, through line 54, toward the end of the collection phase of the loader cycle. A time delay relay TDRD times out opening contacts $D_1$ in control line 58 shifting the valve $V_3$ so a brief blast of ambient air enters the top of the miniature separator 50 through line 56 driving the dust collected in this miniature separator 50 back into the loading chamber 26 of the primary cyclonic separator shown in FIGS. 2 and 3. The vacuum line 18 is shut down by valve $V_3$ during this brief blast of ambient air, and line 54 will also be shut off from the vortex tube atop the primary cyclonic separator. Once the vacuum source motor M is switched off (see FIG. 4) the cycle continues through the loading phase, as described previously.

Thus, valve $V_3$ and miniature cyclonic separator 50 function in a way that is similar to that described with reference to FIG. 5 for the sequential operation of the two filters $F_A$ and $F_B$ and the alternate cleaning thereof during successive loader cycles. The same result is achieved without need of the successive cycling of FIG. 5, and the FIG. 6 embodiment does away with the need of recleaning one of at least two filters during successive loader cycles. Dust recovery is instead achieved during each loader cycle, without the losses otherwise incurred by relying upon filtering, and the need to clean these filters by blasts of ambient air while the vacuum loader runs through successive cycles.

Figure 7:
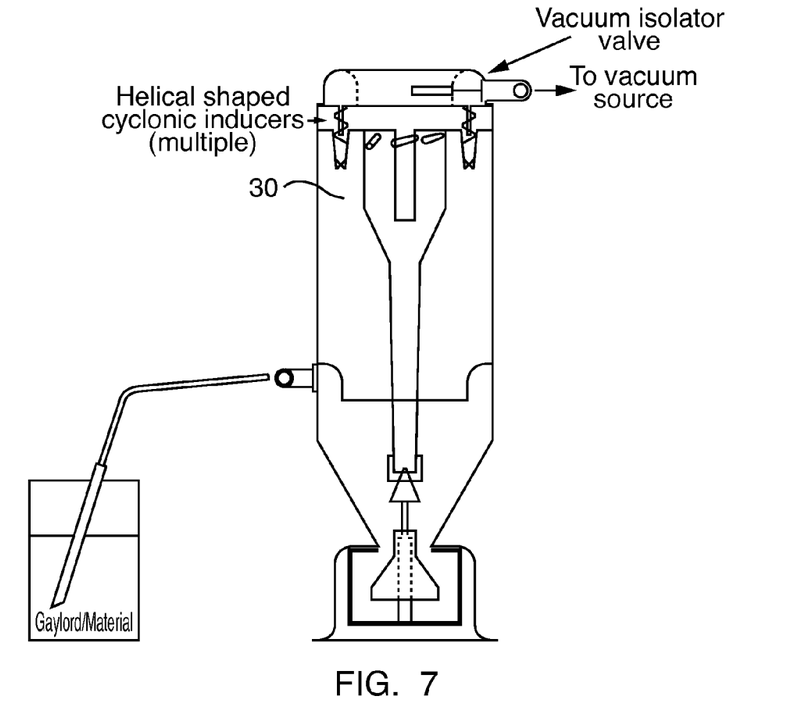
FIGS. 7 and 8 show a version of the FIG. 6 loader having a plurality of miniature separators built into the cyclonic separator of FIGS. 2 and 3.
Figure 8:
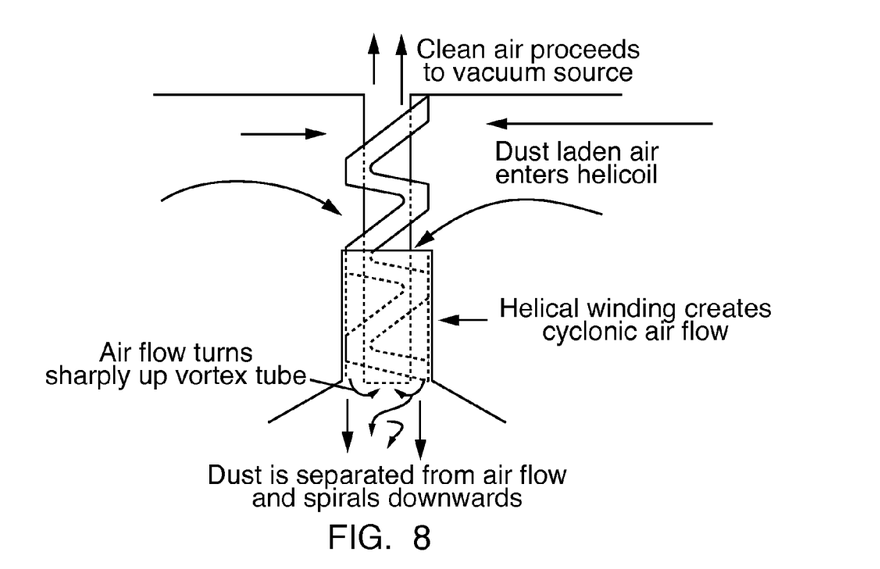

Description of FIGS. 7 and 8 Embodiment

The vacuum loader of FIGS. 2 and 3 is shown in FIG. 7 and includes all the features described plus a plurality of miniature cyclonic separators surrounding the intensifying chamber 30. Each of the miniature separators communicates with the vacuum source at the top of the loader, but with a vacuum isolation valve between that source of vacuum and these miniature separators. Thus, a plurality of miniature separators serve the purpose of the single secondary unit described in the FIG. 6 version. FIG. 8 shows the miniature separators of FIG. 7 in greater detail. Each has its own vortex tube that is selectively connected to the vacuum source or to the ambient air pressure as described for the secondary separator of FIG. 6. A helically shaped baffle surrounds each vortex tube to better induce the cyclonic flow during the dust collection phase.

Although various embodiments of the present invention have been described and shown, the invention is not restricted thereto, but may also be embodied in other ways within the scope of the subject-matter defined in the following claims.

What is claimed is:

1. A vacuum loader for feeding powder to a molding machine, said loader comprising;
    a vacuum operated pickup for conveying powder/dust, said pickup being connected to a vacuum source;
    a generally frusto-conical loading chamber having an inlet opening oriented tangentially into an upper portion of said frusto-conical loading chamber;
    a separation chamber also of frusto-conical shape and having a bottom portion communicating with said loading chamber upper portion, said separation chamber having a closed top portion;
    an intensifying chamber inside said separation chamber, said intensifying chamber having a closed top portion defining an opening to the vacuum source, said intensifying chamber defining a plurality of tangentially oriented inlets from said separation chamber opening into said intensifying chamber adjacent said top portion thereof;
    a collection tube carried by a lower portion of said intensifying chamber and extending downwardly into said loading chamber, said collection tube having an open lower end spaced above an open lower end of said loading chamber;
    dual valve elements for selectively closing the open lower ends of said loading chamber and said collection tube; and
    a control system for opening and closing said dual valve elements, in timed relation to operation of the vacuum source and in response to an input signal indicative of the needs of the processing machine.

2. The loader of claim 1 wherein said dual valve elements are coupled and operated synchronously by said control system in delayed timed relation to normal cycling of the vacuum source such that the finer powder/dust settles in said collection tube during a collection phase of each control system cycle.

3. The loader of claim 1 further including a depending vortex tube at said closed top portion of said intensifying chamber, said vortex tube creating a downward airflow in an upper portion of said intensifying chamber around said vortex tube when the vacuum source is operated.

4. The loader of claim 1 further including an actuator for moving both said dual valve elements synchronously, said dual valve elements coupled by a compressible component accommodating any difference between the spacing between said lower open ends of said loading chamber and said collection tube.

5. The loader of claim 1 wherein said control system cycle includes a powder collection phase and a powder loading phase, and provides a shorter delay time for cycling said vacuum source "on" than the delay time for cycling said dual valve elements to discharge positions.

6. The loader of claim 1 further including a vortex tube centered inside said frusto-conical intensifying chamber and an open top communicating with said top opening of said intensifying chamber, and said vortex tube having an open lower end spaced above the upper open end of said collection tube, whereby said vacuum source draws air downwardly inside said intensifying chamber thence upwardly into said vortex tube, separating the upwardly moving air from the downward movement of the plastic powder/dust.

7. The loader of claim 1 further including an inverted hat shaped baffle in said loading chamber, said hat shaped baffle including a hat brim located above said tangentially oriented inlet into said loading chamber, and said hat shaped baffle having a hat crown portion located below said tangentially oriented inlet.

8. The vacuum loader of claim 1 further comprising a dust filtration and recovery system between said loader and said vacuum source, said system including at least two dust filters arranged in parallel, an inlet valve for directing dust laden vacuum air flow from said loader through one of said at least two dust filters during a given cycle of the loader, an outlet valve for isolating the other of said at least two dust filters during said given cycle, means for reversing air flow through said other of said ay least two dust filters during said given cycle to clear the dust collected therein during a prior loader cycle, and means for reversing air flow and recovering the dust from said other of said at least two filters for return to said loader.

9. Apparatus for vacuum loading powder cyclically and on demand into a processing machine, each loader cycle having a powder collection phase and a powder loading phase, a vacuum source operated during the collection phase, the improvement comprising;
    at least two dust filters arranged in parallel between said loader and said vacuum source, an inlet valve for controlling delivery of dust laden air from the loader through at least two dust filters during a given loader cycle, an outlet valve for isolating one of said at least two dust filters during said given cycle, means for reversing airflow through at least one of said at least two filters during said given cycle to clear the dust captured therein during a prior cycle, and means for recovering and returning the dust cleared from said at lease one filter to said loader along with the reversed air flow.

10. Apparatus for vacuum loading powder cyclically and on demand into a processing machine, each loader cycle having a powder collection and powder loading phase, and a primary cyclonic separator operated from a vacuum source during the collection phase, the improvement comprising:
    a secondary cyclonic separator between the loader and the vacuum source, valve means controlling delivery of dust laden air from the loader into said secondary cyclonic separator during the collection phase of the loader's cycle, and valve means admitting ambient air at the upper end of said secondary cyclonic separator toward the end of said collection phase to reverse the flow of dust laden air in said secondary cyclonic separator, and an air line connecting the lower end of said secondary cyclonic separator communicating with said loader for allowing dust and ambient air flow to move down from said secondary cyclonic separator into said loader only toward the end of said collection phase of the loader cycle.

11. The apparatus of claim 10 wherein a plurality of secondary separators are built into said primary cyclonic separator and a manifold connecting said secondary separators to a vacuum source or to a source of air pressure through said valve means.

12. The apparatus of claim 10 wherein said secondary cyclonic separator includes a vortex tube and a helical baffle surrounding said vortex tube.

13. The vacuum loader of claim 5 further characterized by a plurality of miniature separators arranged inside the top portion of the loader, each miniature separator including an outlet manifold selectively connected to the vacuum source by a valve to isolate the manifold from the vacuum source and admit ambient air toward the end of the collection phase of the loader cycle.

14. The vacuum loader of claim 13 wherein said miniature separators each include a depending open ended tube projecting downwardly from said manifold, and a helically shaped baffle inside each open ended tube for creating a cyclonically circulating flow in said tube.

\* \* \* \* \*